US012199334B2

(12) United States Patent
Chen

(10) Patent No.: US 12,199,334 B2
(45) Date of Patent: Jan. 14, 2025

(54) ANTENNA MODULE AND ELECTRONIC DEVICE

(71) Applicant: VIVO MOBILE COMMUNICATION CO., LTD., Dongguan (CN)

(72) Inventor: Jia Chen, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 216 days.

(21) Appl. No.: 17/965,572

(22) Filed: Oct. 13, 2022

(65) Prior Publication Data

US 2023/0030798 A1 Feb. 2, 2023

Related U.S. Application Data

(63) Continuation of application No. PCT/CN2021/085810, filed on Apr. 7, 2021.

(30) Foreign Application Priority Data

Apr. 13, 2020 (CN) ......................... 202010283862.5

(51) Int. Cl.

*H01Q 1/24* (2006.01)
*H01Q 9/04* (2006.01)
*H01Q 19/10* (2006.01)
*H01Q 21/08* (2006.01)

(52) U.S. Cl.

CPC ............. *H01Q 1/24* (2013.01); *H01Q 9/0414* (2013.01); *H01Q 19/10* (2013.01); *H01Q 21/08* (2013.01)

(58) Field of Classification Search

CPC .......... H01Q 1/24; H01Q 19/10; H01Q 21/08; H01Q 21/28; H01Q 9/0407; H01Q 9/0414

See application file for complete search history.

(56) References Cited

U.S. PATENT DOCUMENTS

| | | | | |
|---|---|---|---|---|
| 8,760,352 | B2 | 6/2014 | Rao et al. | |
| 9,979,093 | B2 | 5/2018 | Pu et al. | |
| 9,984,985 | B1 | 5/2018 | Chiang et al. | |
| 10,673,142 | B2 | 6/2020 | Ueda | |
| 10,804,597 | B2 | 10/2020 | Xia et al. | |
| 11,088,468 | B2 | 8/2021 | Joung et al. | |
| 11,277,915 | B2 | 3/2022 | Kim et al. | |
| 2013/0292808 | A1 | 11/2013 | Yen et al. | |
| 2017/0346185 | A1 | 11/2017 | Wang et al. | |
| 2018/0337456 | A1* | 11/2018 | Liu | H01Q 21/0075 |
| 2019/0140143 | A1* | 5/2019 | Pfeuffer | H01L 33/44 |
| 2019/0229413 | A1 | 7/2019 | Jong et al. | |
| 2019/0327834 | A1 | 10/2019 | Kim et al. | |
| 2021/0398924 | A1* | 12/2021 | You | H01L 23/49833 |

(Continued)

FOREIGN PATENT DOCUMENTS

| | | | |
|---|---|---|---|
| CN | 101667677 | A | 3/2010 |
| CN | 103367917 | A | 10/2013 |

(Continued)

*Primary Examiner* — Thien M Le
(74) *Attorney, Agent, or Firm* — The Webb Law Firm

(57) ABSTRACT

An antenna module includes a first substrate, a second substrate, and a signal processing chip. The second substrate and the signal processing chip are located on a same side of the first substrate. A side of the first substrate that faces away from the second substrate is provided with a first antenna array, and the second substrate bears a second antenna array.

16 Claims, 3 Drawing Sheets

(56) References Cited

U.S. PATENT DOCUMENTS

| | | | | |
|---|---|---|---|---|
| 2022/0013891 | A1* | 1/2022 | Yang | H01P 1/184 |
| 2022/0085509 | A1* | 3/2022 | Qu | H01Q 1/2283 |
| 2022/0131281 | A1* | 4/2022 | Shah | H01Q 25/00 |
| 2022/0271423 | A1* | 8/2022 | Kovacic | H01Q 3/36 |
| 2022/0352622 | A1* | 11/2022 | Choudhury | H01Q 1/3275 |
| 2022/0416443 | A1* | 12/2022 | Cai | H01Q 19/10 |
| 2023/0077615 | A1* | 3/2023 | Zhang | H01Q 21/0006 343/702 |
| 2023/0170604 | A1* | 6/2023 | Jo | H01Q 1/243 343/702 |

FOREIGN PATENT DOCUMENTS

| | | | |
|---|---|---|---|
| CN | 104219344 | A | 12/2014 |
| CN | 102522634 | A | 4/2015 |
| CN | 103336559 | B | 1/2018 |
| CN | 108448230 | A | 8/2018 |
| CN | 110021815 | A | 7/2019 |
| CN | 111430884 | A | 7/2020 |
| JP | 2018033078 | A | 3/2018 |
| KR | 1020190123122 | A | 10/2019 |
| WO | 2011078558 | A2 | 6/2011 |

* cited by examiner

ANTENNA MODULE AND ELECTRONIC DEVICE

CROSS-REFERENCE TO RELATED APPLICATIONS

This application is a Bypass Continuation Application of PCT/CN2021/085810 filed Apr. 7, 2021, which claims priority to Chinese Patent Application No. 202010283862.5, filed Apr. 13, 2020, the disclosures of which are hereby incorporated by reference in their entirety.

BACKGROUND OF THE INVENTION

Field of the Invention

The present disclosure relates to the field of communications technologies, and in particular, to an antenna module and an electronic device.

Description of Related Art

At present, most electronic devices are equipped with antennas for wireless communication, such as a positioning antenna for achieving a positioning function and a Bluetooth antenna for achieving Bluetooth communication. With the increasingly strong demand for metal appearance and 5G and multi input multi output (MIMO) technologies, the number of antennas in an electronic device is also increasing. The MIMO technology is usually implemented based on an antenna array. An existing antenna module implements the dual polarization of one antenna array at most. When more antenna arrays are laid out, a larger mounting space is required in the electronic device to lay out the antenna module, which is not conducive to developing the electronic device that is lighter and thinner.

SUMMARY OF THE INVENTION

Embodiments of the present disclosure provide an antenna module and an electronic device.

According to a first aspect, the embodiments of the present disclosure provide an antenna module, including a first substrate, a second substrate, and a signal processing chip, where the second substrate and the signal processing chip are located on a same side of the first substrate, a side of the first substrate that faces away from the second substrate is provided with a first antenna array, and the second substrate bears a second antenna array.

According to a second aspect, the embodiments of the present disclosure further provide an electronic device, including the antenna module according to the first aspect.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings.

DESCRIPTION OF THE INVENTION

Figure 1:
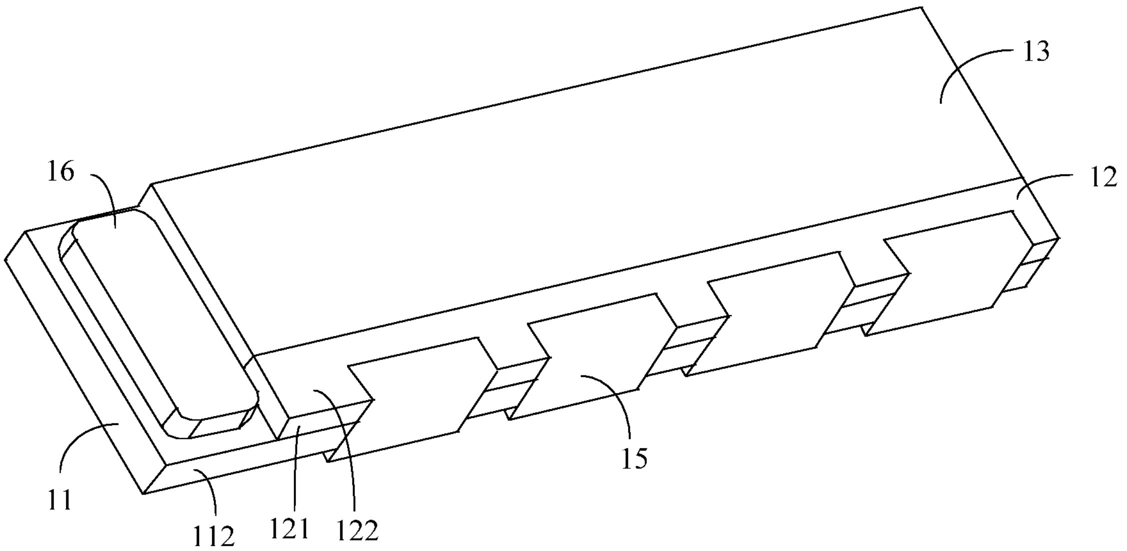
FIG. 1 is a structural diagram of an antenna module according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

An embodiment of the present disclosure provides an antenna module. Referring to FIG. 1 to FIG. 5, the antenna module includes a first substrate 11, a second substrate 12, and a signal processing chip 13, where the second substrate 12 and the signal processing chip 13 are located on a same side of the first substrate 11, a side of the first substrate 11 that faces away from the second substrate 12 is provided with a first antenna array 14, and the second substrate 12 bears a second antenna array 15.

It should be noted that, the signal processing chip 13 may be an integrated circuit (IC) chip, and the signal processing chip 13 may include components such as a transceiver, a power supply, an RF front end (the radio frequency front end including a power amplifier, an antenna switch, a filter, a duplexer, and a low noise amplifier).

In this embodiment, the antenna module includes the first substrate 11 and the second substrate 12, the first substrate 11 may be a main substrate of the antenna module, and the first substrate 11 may be provided with a metal ground plane to implement the grounding of the antenna module. Each of the second substrate 12 and the signal processing chip 13 is located on one side of the first substrate 11, and each of the first substrate 11 and the second substrate 12 bears an antenna array. In this way, two antenna arrays may be laid out on the antenna module, to implement dual polarization MIMO of the two antenna arrays, thereby reducing the number of antenna modules in an electronic device effectively, which is more conducive to developing the electronic device that is lighter and thinner.

Figure 2:
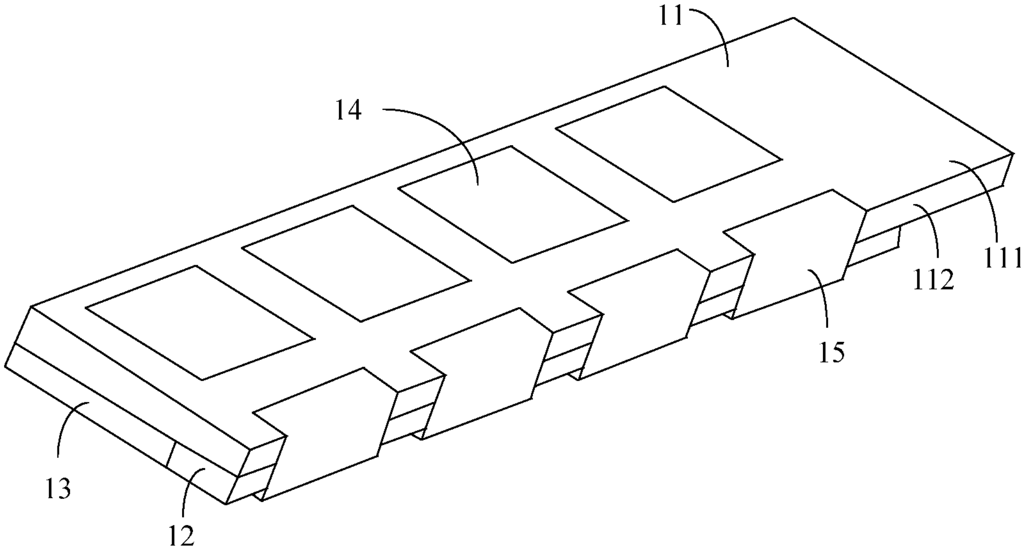
FIG. 2 is a structural diagram of the antenna module in FIG. 1 from another perspective.
Figure 3:
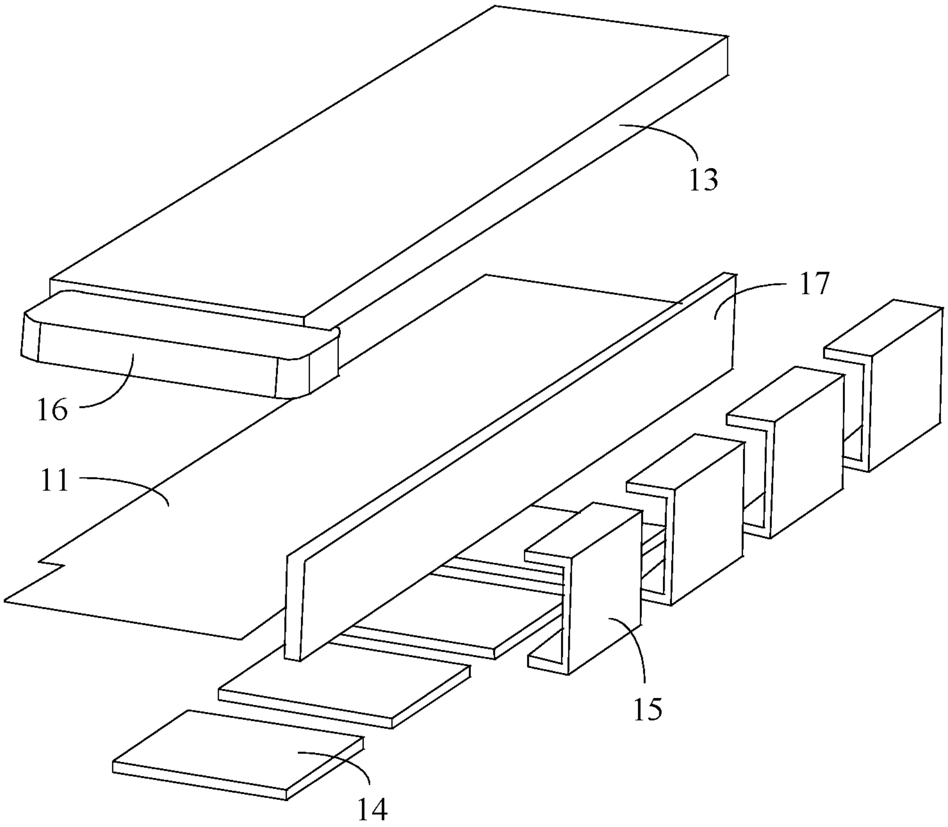
FIG. 3 is an exploded view of the antenna module in FIG. 1 not including a second substrate.

Each of the first antenna array 14 and the second antenna array 15 is formed by arranging a plurality of antenna elements in array, and the number of antenna elements included in the first antenna array 14 may be the same as or different from the number of antenna elements included in the second antenna array 15. As shown in FIG. 2 and FIG. 3, in an embodiment, the first antenna array 14 includes four first antenna elements, the second antenna array 15 includes four second antenna elements, and the four first antenna elements are disposed corresponding to the four second antenna elements one to one. Optionally, a thickness of the second substrate 12 is less than or equal to a thickness of the signal processing chip 13. In this way, an overall thickness of the antenna module is caused to be still a sum of thicknesses of the first substrate 11 and the signal processing chip 13, and the arrangement of the second substrate 12 does not increase the overall thickness of the antenna module, which is more conducive to the layout of the antenna module in the electronic device and is also conducive to developing the electronic device that is lighter and thinner.

It can be understood that, the second substrate 12 is disposed on the one side of the first substrate 11, and the arrangement position, shape, and size of the second substrate 12 on the first substrate 11 may vary depending on a specific situation.

Optionally, referring to FIG. 1 to FIG. 3, in an embodiment, the second substrate 12 and the signal processing chip 13 are disposed on the one side of the first substrate 11 side by side. Optionally, the first substrate 11 includes a first surface 111 and a second surface 112 connected to each other, the first surface 111 faces away from the second substrate 12, the second substrate 12 includes a third surface 121 and a fourth surface 122 connected to each other, the fourth surface 122 faces away from the first substrate 11, and the second surface 112 is flush with the third surface 121. The second antenna array 15 includes at least one antenna element, and each antenna element is in contact with at least the second surface 112 and the third surface 121. That is to say, the each antenna element of the second antenna array 15 is in contact with the first substrate 11 and the second substrate 12. In this way, the arrangement of the second substrate 12 is equivalent to an increase in an overall thickness of a substrate configured to bear an antenna array, that is, an increase in a ground clearance of the second antenna array 15 borne by the second substrate 12. In addition, the each antenna element may avoid being blocked by surrounding devices in a radiation direction and play a role in improving antenna efficiency and coverage.

For ease of description, the antenna elements in the second antenna array 15 are collectively referred to as second antenna elements below. Optionally, each second antenna element may cover the second surface 112 and the third surface 121; or the each second antenna element may cover the first surface 111, the second surface 112, and the third surface 121.

In an implementation, as shown in FIG. 1 to FIG. 3, the each second antenna element is bent, so that the second antenna element is not completely disposed on the second substrate 12, but is in contact with both the first substrate 11 and the second substrate 12. In this implementation, in a case that a width of the second substrate 12 is relatively small, the bending of the second antenna element may similarly play a role in bearing the second antenna element, that is, an overall width of the antenna module is caused to be the width of the first substrate 11, and the arrangement of the second substrate 12 does not additionally increase the width and thickness of the antenna module, which is more conducive to the mounting and layout of the antenna module in the electronic device.

In this embodiment, the second antenna array 15 includes at least one antenna element, and the at least one antenna element is arranged in array in a length direction of the second substrate 12, and a length of the second substrate 12 is greater than or equal to a length of a connection line of two antenna elements farthest from each other in the second antenna array 15. That is to say, an array arrangement direction of the second antenna elements on the second substrate 12 is consistent with the length direction of the second substrate 12, and the length of the second substrate 12 is greater than a length of a connection line of the second antenna elements to ensure that the second substrate 12 plays a role in bearing the each second antenna element.

As shown in FIG. 1 and FIG. 2, the second antenna array 15 includes four second antenna elements, the four second antenna elements are arranged in a row in the length direction of the second substrate 12, and all the second antenna elements are at equal intervals. In addition, a distance between a left side of the leftmost second antenna element and a right side of the rightmost second antenna element is less than the length of the second substrate 12, so that the second substrate 12 can better play a role in bearing the second antenna elements to ensure the mounting stability of the second antenna elements.

In addition, a width of the second substrate 12 satisfies that the second antenna element does not protrude from the second substrate 12, that is to say, a width of a part of the second antenna element covering the fourth surface 122 is less than the width of the second substrate 12. It should be noted that, an overall width of the second antenna element, that is, a sum of widths of parts of the second antenna element covering the first surface 111, the second surface 112, the third surface 121, and the fourth surface 122, relates to an operating frequency band of the second antenna element; and the lower the operating frequency band of the second antenna element, the larger the overall width of the second antenna element. It can be understood that, the width of the second substrate 12 may be adjusted according to a width of a part of the second antenna element covering the fourth surface 122. For example, the larger the width of the second antenna element covering the first surface 111, the smaller the width of the second antenna element covering the fourth surface 122, so the width of the second substrate 12 may be correspondingly designed to be smaller, making layout of components on the signal processing chip 13 more flexible, but the width of the second substrate 12 still satisfies that the second antenna element does not protrude from the second substrate 12.

In this embodiment, a sum of thicknesses of the first substrate 11 and the second substrate 12 is one quarter to three quarters of a wavelength of the corresponding operating frequency band of the antenna module. For example, the sum of the thicknesses of the first substrate 11 and the second substrate 12 may be one quarter of the wavelength of the corresponding operating frequency band of the antenna module, or the sum of the thicknesses of the first substrate 11 and the second substrate 12 may be half of the wavelength of the corresponding operating frequency band of the antenna module, or the sum of the thicknesses of the first substrate 11 and the second substrate 12 may be three quarters of the wavelength of the corresponding operating frequency band of the antenna module. In this way, the thickness of each of the first substrate 11 and the second substrate 12 may be set according to the corresponding operating frequency band of the antenna module to achieve higher transmission and reception conversion efficiency of the antenna module.

Referring to FIG. 1 and FIG. 3, in this embodiment, the second substrate 12 and the signal processing chip 13 are disposed on a same layer relative to the first substrate 11, the antenna module may further include a reflector 17, the reflector 17 is disposed between the second substrate 12 and the signal processing chip 13, and the reflector 17 is connected to a ground plane of the first substrate 11 or a ground plane of the second substrate 12. The ground plane of the first substrate 11 may refer to a metal layer disposed on the first substrate 11 to make the first substrate 11 achieve a grounding function, and the ground plane of the second substrate 12 may also refer to a metal layer disposed on the second substrate 12. The reflector 17 is connected to the ground plane to ground the reflector 17. The reflector 17 is disposed between the second substrate 12 and the signal processing chip 13, and is used as an antenna reflection surface of the second antenna array 15 to ensure the signal reception and transmission effects of the second antenna array 15.

Optionally, the reflector 17 may be a metal plate, such as an aluminum plate, a copper plate, or a titanium plate. Alternatively, the reflector 17 includes through holes arranged in array (not shown in the drawings), a through hole includes a first opening and a second opening which are communicated with each other, the first opening faces the signal processing chip 13, and the second opening faces the second substrate 12. For example, the reflector 17 is a metal plate, the metal plate is provided with a plurality of through holes, and the plurality of through holes are arranged in array at certain intervals, for example, the interval between the through holes is 0.1 mm to 0.5 mm. In a solution, the interval between the through holes is 0.2 mm.

In this implementation, the arrangement of the through holes may reduce a weight of the reflector 17, that is, reduce a weight of the antenna module, which is more conducive to developing the electronic device that is lighter and thinner.

Optionally, in a case that a width of the second substrate 12 is relatively large, that is, a case that a width of the fourth surface 122 is relatively large, the fourth surface 122 is further provided with a third antenna array. In this case, a width of the antenna module may still be a width of the first substrate 11, that is to say, neither the second substrate 12 nor the signal processing chip 13 goes beyond a width range of the first substrate 11. In this way, in a case that the overall thickness and width of the antenna module are not increased, the antenna module may include three antenna arrays, that is, a channel capacity of the antenna module is increased, and the number of antenna modules in the electronic device is reduced, which is more conducive to developing the electronic device that is lighter and thinner.

Figure 4:
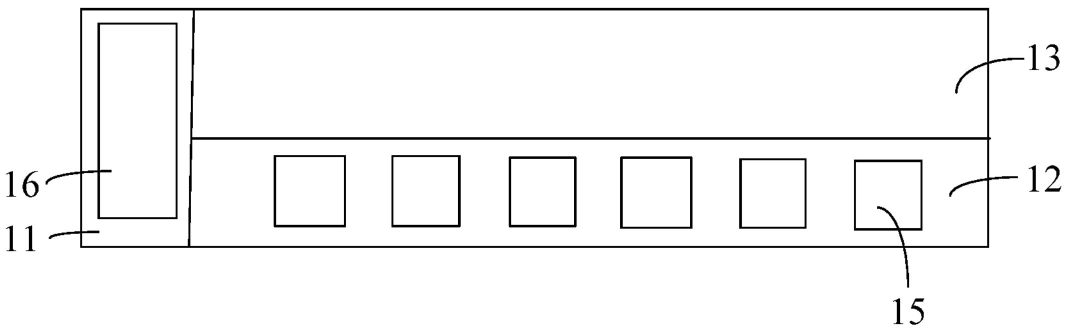
FIG. 4 is a structural diagram of another antenna module according to an embodiment of the present disclosure.
Figure 5:
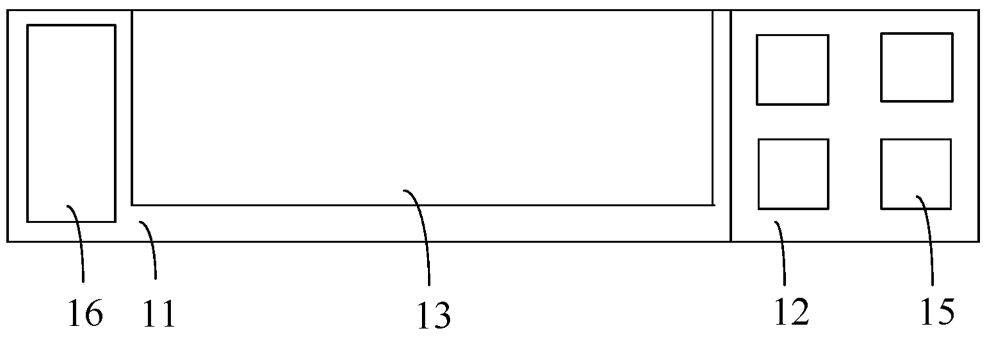
FIG. 5 is a structural diagram of still another antenna module according to an embodiment of the present disclosure.

Referring to FIG. 4 and FIG. 5, in another optional embodiment, the second antenna array 15 is disposed on a surface of the second substrate 12 faces away from the first substrate 11. That is to say, the second antenna element in the second antenna array 15 is not bent, but is laid flat on the second substrate 12. In this implementation solution, as the antenna reflection surface of the second antenna array 15, the first substrate 11 then has no need to be provided with an extra reflector, so that an entire structure of the antenna module is simpler and dual polarization MIMO of two antenna arrays can also be implemented similarly.

It should be noted that, an arrangement direction of the antenna elements in the second antenna array 15 is consistent with a length extension direction of the second substrate 12. As shown in FIG. 4, the second substrate 12 and the signal processing chip 13 are disposed side by side, the second antenna array 15 includes six second antenna elements, and the six second antenna elements are arranged in a row in the length direction of the second substrate 12.

Alternatively, referring to FIG. 5, in another embodiment, the second antenna array 15 is also disposed on a surface of the second substrate 12 faces away from the first substrate 11, the second substrate 12 and the signal processing chip 13 are disposed side by side, the second antenna array 15 includes four second antenna elements, and the four second antenna elements are arranged in a 2×2 array.

It can be understood that, according to the embodiments provided in FIG. 4 and FIG. 5, the second antenna element has no need to be bent and the arrangement position, shape, and size of the second substrate 12 are more flexible, so that the position of the second antenna array 15 can be adjusted on the second substrate 12 according to a use requirement and a use area of the antenna module is fully used, which facilitates the stacking and mounting layout of the antenna module in the electronic device.

In addition, referring to FIG. 1 to FIG. 5, the antenna module provided by the present disclosure may further include a board-to-board (BTB) connector. The BTB connector 16 is disposed on a side of the first substrate 11 and is disposed on the same side with the second substrate 12 and the signal processing chip 13.

The embodiments of the present disclosure further provide an electronic device, and the electronic device includes all the technical features of the antenna module described in the above embodiments, and may achieve the same technical effect. In order to avoid repetition, details are not described again herein.

The electronic device may include a mobile phone, a tablet computer, an e-book reader, an MP3 player, an MP4 player, a digital camera, a laptop portable computer, a vehicle mounted computer, a desktop computer, a set-top box, a smart TV, and a wearable device.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An antenna module, comprising a first substrate, a second substrate, and a signal processing chip, wherein the second substrate and the signal processing chip are located on a same side of the first substrate, a side of the first substrate that faces away from the second substrate is provided with a first antenna array, and the second substrate bears a second antenna array;

the first substrate comprises a first surface and a second surface connected to each other, the first surface faces away from the second substrate, the second substrate comprises a third surface and a fourth surface connected to each other, the fourth surface faces away from the first substrate, and the second surface is flush with the third surface; and the second antenna array comprises at least one antenna element, and each antenna element is in contact with at least the second surface and the third surface.

2. The antenna module according to claim 1, wherein a sum of thicknesses of the first substrate and the second substrate is one quarter to three quarters of a wavelength of a corresponding operating frequency band of the antenna module.

3. The antenna module according to claim 1, wherein a thickness of the second substrate is less than or equal to a thickness of the signal processing chip.

4. The antenna module according to claim 1, wherein the fourth surface is further provided with a third antenna array.

5. The antenna module according to claim 1, wherein the second substrate and the signal processing chip are disposed on a same layer relative to the first substrate, the antenna module further comprises a reflector, the reflector is disposed between the second substrate and the signal processing chip, and the reflector is connected to a ground plane of the first substrate or a ground plane of the second substrate.

6. The antenna module according to claim 5, wherein the reflector is provided with through holes arranged in array, a through hole comprises a first opening and a second opening which are communicated with each other, the first opening faces the signal processing chip, and the second opening faces the second substrate.

7. The antenna module according to claim 1, wherein the second antenna array is disposed on a surface of the second substrate faces away from the first substrate.

8. The antenna module according to claim 1, wherein the antenna module further comprises a board-to-board (BTB) connector, and the BTB connector is disposed on a side of the first substrate and is located on a same side with the second substrate and the signal processing chip.

9. An electronic device, comprising an antenna module wherein the antenna module comprises a first substrate, a second substrate, and a signal processing chip, wherein the second substrate and the signal processing chip are located on a same side of the first substrate, a side of the first substrate that faces away from the second substrate is provided with a first antenna array, and the second substrate bears a second antenna array;

the first substrate comprises a first surface and a second surface connected to each other, the first surface faces away from the second substrate, the second substrate comprises a third surface and a fourth surface connected to each other, the fourth surface faces away from the first substrate, and the second surface is flush with the third surface; and the second antenna array comprises at least one antenna element, and each antenna element is in contact with at least the second surface and the third surface.

10. The electronic device according to claim 9, wherein a sum of thicknesses of the first substrate and the second substrate is one quarter to three quarters of a wavelength of a corresponding operating frequency band of the antenna module.

11. The electronic device according to claim 9, wherein a thickness of the second substrate is less than or equal to a thickness of the signal processing chip.

12. The electronic device according to claim 9, wherein the fourth surface is further provided with a third antenna array.

13. The electronic device according to claim 9, wherein the second substrate and the signal processing chip are disposed on a same layer relative to the first substrate, the antenna module further comprises a reflector, the reflector is disposed between the second substrate and the signal processing chip, and the reflector is connected to a ground plane of the first substrate or a ground plane of the second substrate.

14. The electronic device according to claim 13, wherein the reflector is provided with through holes arranged in array, a through hole comprises a first opening and a second opening which are communicated with each other, the first opening faces the signal processing chip, and the second opening faces the second substrate.

15. The electronic device according to claim 9, wherein the second antenna array is disposed on a surface of the second substrate faces away from the first substrate.

16. The electronic device according to claim 9, wherein the antenna module further comprises a board-to-board (BTB) connector, and the BTB connector is disposed on a side of the first substrate and is located on a same side with the second substrate and the signal processing chip.

* * * * *